UNITED STATES PATENT OFFICE.

EMERICH SZARVASY, OF BUDAPEST, AUSTRIA-HUNGARY.

PROCESS FOR SAPONIFICATION OF THE CHLORIN DERIVATIVES OF ALIPHATIC HYDROCARBONS.

1,181,697. Specification of Letters Patent. Patented May 2, 1916.

No Drawing. Application filed November 2, 1915. Serial No. 59,301.

*To all whom it may concern:*

Be it known that I, EMERICH SZARVASY, Ph. D., subject of the King of Hungary, residing at 4 Gellért-tér, Budapest, Austria-Hungary, have invented a new and useful Improvement in Processes for Saponification of the Chlorin Derivatives of Aliphatic Hydrocarbons; and I do hereby declare the following to be a full, clear, and exact description of the same.

It is well known that the chlor derivatives of aliphatic hydrocarbons can be saponified with hot alkaline solutions whereby, for instance, the derivatives of methane containing two or more atoms of chlorin are transformed into glycol, formic acid, &c., and methyl chlorid into methyl alcohol. In the industrial performance of these reactions, high pressures and temperatures are used in order to accelerate the reaction. The high pressures and temperatures require the use of metallic vessels as reaction chambers, which suffer heavy corrosions owing to the fact, as my experiments have shown, that the one phase of the reaction taking place exclusively in the gas space results in the chlor derivatives and the vaporized water forming hydrochloric acid which attacks the metal. The second phase of the reaction consists of the absorption of the hydrochloric acid in alkaline solution shifting the equilibrium of the reversible reaction between the chlor derivatives and the vaporized water continually in a way to allow of fresh parts of the chlor derivatives reacting successively with the vaporized water. If, however, the reaction is carried out in large proportions in big alkali-proof vessels, especially in iron vessels, a very strong corrosion of the walls of the vessel can be observed which cannot be explained by the reaction, if it takes place in the above supposed way, because iron is not attacked by methyl chlorid nor by the alkaline solution.

My experiments have shown that the reaction takes place only to a very small extent immediately between the alkaline solution and the gas, but especially at the high pressures and temperatures necessary for the industrial exploitation in order to accelerate the reaction. This latter takes place in two successive phases.

The first phase takes place exclusively in the gas space of the reaction chamber, the methyl chlorid going into a reversible reaction with the vaporized water, resulting in the gas space in a mixture of methyl alcohol, hydrochloric acid, methyl chlorid and water, said mixture being in equilibrium at a constant pressure and temperature. The second phase of the reaction consists of the absorption of the hydrochloric acid from this mixture by the alkaline solution, disturbing or shifting thereby the equilibrium of the gas mixture continually in such a way that fresh quantities of methyl chlorid, glycol, formic acid or the like successively go into reaction with the vaporized water under formation of hydrochloric acid. In this way a strong corrosion of the metallic vessel is comprehensible, because the free hydrochloric acid in the gas space easily attacks the metallic surfaces inclosing the gas space. The presence of hydrogen liberated thereby can be effectively proved in the gas mixture.

According to my innovation I provide means by which the walls of the reaction vessel and all metallic surfaces in contact with the gases contained in the gas space of the reaction chamber, will be coated with alkaline solution, so that the free hydrochloric acid present in the gas space can come in contact with only the alkaline solution.

The following is one of many possible examples of my process: An iron vessel is charged with 520 g. of methyl chlorid, 3500 g. water and 330 g. oxid of calcium and rotated about its horizontal axis for two hours, the temperature at the same time being raised to 140° C. The pressure rises to 20–24 atmospheres, 96 per cent. of the theoretical quantity of methyl alcohol is obtained, and the alkaline solution proves to be free from iron, as the rotation of the vessel causes the walls inclosing the gas space to be coated continually with a layer of alkali solution.

The process can be modified in different ways, for instance, the vessel can be stationary and the coating of the walls with alkaline solution can be effected through mixing devices, atomizers, pumps or the like.

By coating the walls of the reaction chamber with a thin layer of alkaline solution, the surface is greatly enlarged and hence the absorption of the hydrochloric acid and the reaction between methyl chlorid and water is substantially accelerated.

My process can be used for hastening the reaction and increasing the output with other than metallic vessels and with other chlor derivatives of aliphatic hydrocarbons.

What I claim is:

1. A process for the saponification of chlor derivatives of aliphatic hydrocarbons, said process consisting in inclosing a mixture of a chlor derivative of an aliphatic hydrocarbon and an alkaline solution within a reaction space; surrounding the reaction space with a film of said materials and raising the temperature and pressure in the vessel.

2. A process for the saponification of chlor derivatives of aliphatic hydrocarbons in a closed vessel, said process consisting in charging the vessel with an alkaline solution and a chlor derivative of an aliphatic hydrocarbon; coating the interior of the vessel with a film of the liquids therein; and raising the temperature and pressure in the vessel.

3. A process for the saponification of chlor derivatives of aliphatic hydrocarbons in a closed vessel, said process consisting in charging the vessel with an alkaline solution and a chlor derivative of an aliphatic hydrocarbon; coating the interior of the vessel with a film of the liquids therein by rotating the vessel and raising the temperature of the materials to about 140° C., and the pressure to about 20-24 atmospheres.

4. A process for the manufacture of methyl alcohol from methyl chlorid, said process consisting in inclosing a mixture of methyl chlorid and alkaline solution within a reaction space; surrounding said reaction space with a film of said materials and bringing about reactions between said materials to form methyl alcohol.

5. A process for the manufacture, in a closed vessel, of methyl alcohol from methyl chlorid, said process consisting in charging the vessel with methyl chlorid and an alkaline solution; coating the interior face of the vessel with a film of the liquids therein; and raising the temperature and pressure in the vessel.

6. A process for manufacturing, in a closed vessel, of methyl alcohol from methyl chlorid, said process consisting in charging the vessel with methyl chlorid, calcium oxid and water; rotating the vessel upon a horizontal axis whereby a film of the liquids therein is formed on the inner face of the vessel; and raising the temperature of the materials to about 140° C., and the pressure to about 20-24 atmospheres.

In testimony whereof, I have signed my name to this specification in the presence of two subscribing witnesses.

EMERICH SZARVASY, Ph. D.

Witnesses:
JOSEPH HARGA,
EUGENE F. CASSANY.